United States Patent [19]
Horkey

[11] Patent Number: 5,165,364
[45] Date of Patent: Nov. 24, 1992

[54] BIRD FEEDER ROTARY APPARATUS

[75] Inventor: Edward J. Horkey, Phoenix, Ariz.

[73] Assignee: Horkey & Associates Inc., Tempe, Ariz.

[21] Appl. No.: 771,234

[22] Filed: Oct. 4, 1991

[51] Int. Cl.⁵ .............................................. A01K 39/01
[52] U.S. Cl. ...................................... 119/57.8; 119/29
[58] Field of Search .................. 119/57.8, 57.9, 52.2, 119/52.3, 29, 51.01, 24; 272/49, 31 R; D30/124–129; 446/451

[56] References Cited
FOREIGN PATENT DOCUMENTS
2127266 4/1984 United Kingdom .............. 119/57.8

Primary Examiner—John G. Weiss
Attorney, Agent, or Firm—William W. Haefliger

[57] ABSTRACT

A bird feeder apparatus comprising a wheel having a substantially horizontal axis of rotation about which the wheel is mounted for free rotation in an upright plane; bird feeder tray structure carried by the wheel to pivot relative thereto at multiple locations about the axis; whereby the bird feed in the tray structure remains presented upwardly as the wheel rotates in response to bird weight application to the tray structure.

16 Claims, 2 Drawing Sheets

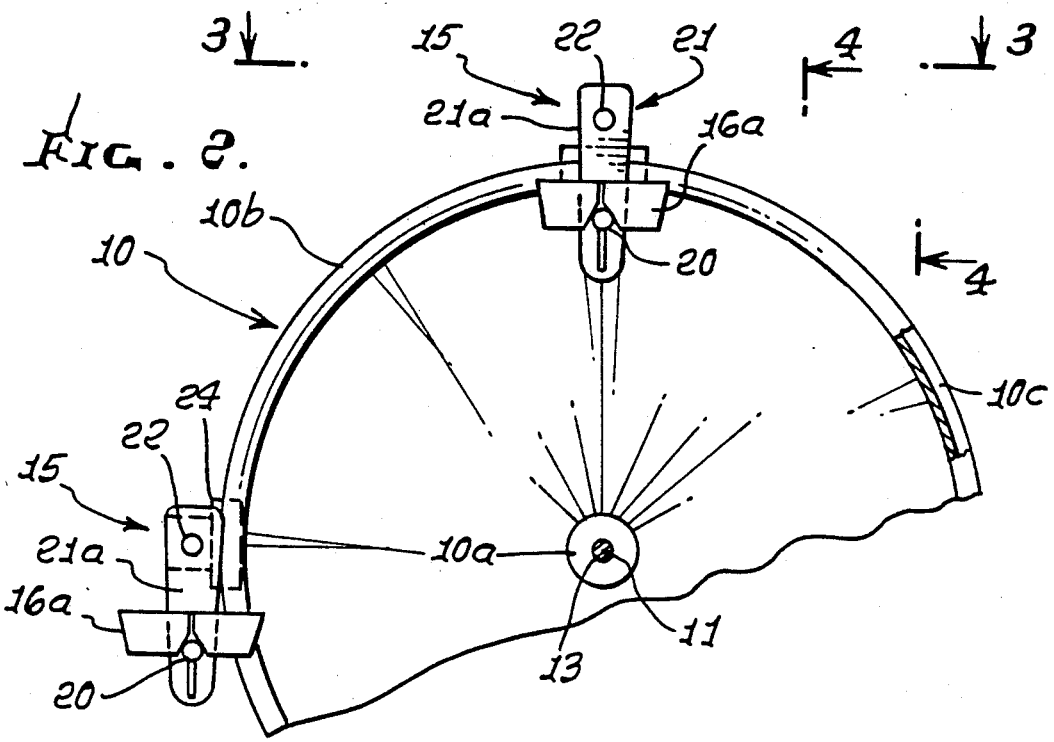
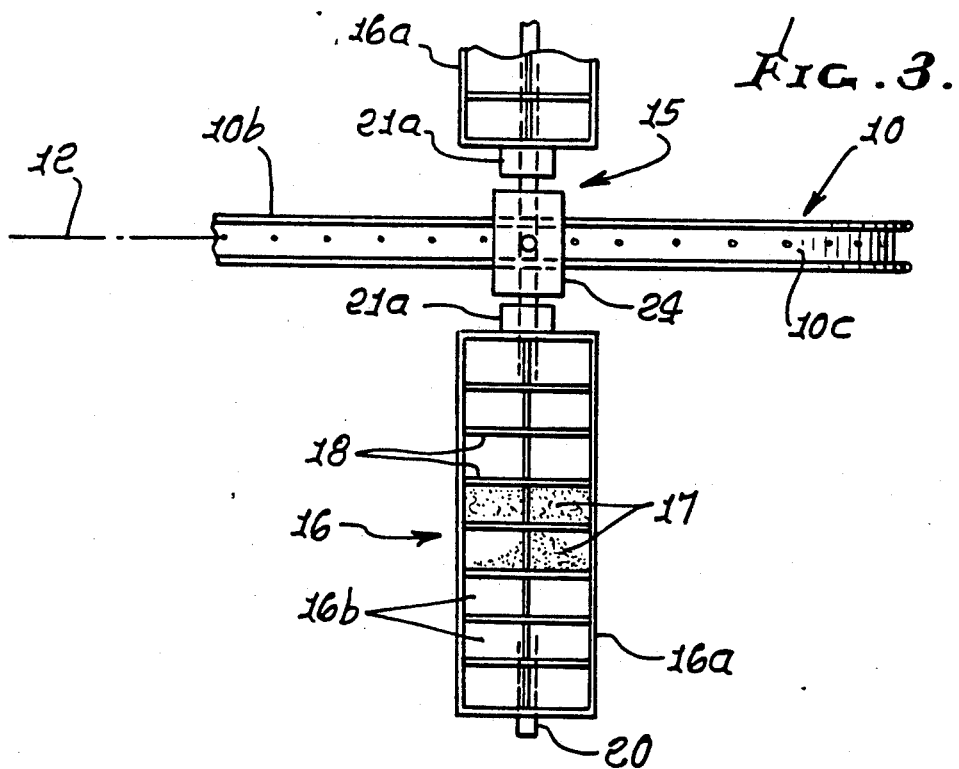

BIRD FEEDER ROTARY APPARATUS

BACKGROUND OF THE INVENTION

This invention relates generally to bird feeders, and more particularly to a bird feeder of ferris-wheel type where multiple feed trays are rotatable about a wheel axis, enhancing bird watching enjoyment.

Bird feeders in general have fixed positions whereby the only observable movement is attributable to birds flying toward and away from the feeder or moving at feeder trays. There is need for attractive feeder apparatus imparting further observable movement to birds and the feeder, as at such times that the birds land on the feeder. There is also need for movable feeder means holding a relatively large amount of bird feed.

SUMMARY OF THE INVENTION

It is a major object of the invention to provide simple, effective, low-cost, bird weight-driven apparatus meeting the above need. Basically, and in accordance with the invention, the novel and effective feeder apparatus comprises:

a) a wheel having a substantially horizontal axis of rotation about which the wheel is mounted for free rotation in an upright plane, b) bird feeder tray means carried by the wheel to pivot relative thereto at multiple locations about the axis, c) whereby the bird feed in the tray means remains presented upwardly as the wheel rotates in response to bird weight application to the tray means.

As will appear, the tray means may typically and advantageously project at opposite sides of the wheel, and at multiple locations about the wheel axis, affording a great deal of feed storage space, which is openly presented for observation as the tray means move about the wheel axis in response to bird perching on the different tray means. Birds imposing weight on either or both of the trays projecting at opposite sides of the wheel plane exert a torque acting to rotate the wheel. In this regard, pivot means is typically carried by the wheel and supporting the trays to freely pivot about horizontal axes projecting generally normal to the plane, whereby the trays and bird feed therein remain presented upright as the wheel rotates.

A further object is to provide a wheel having an annular rim, and including structure projecting from the rim to support carrier means freely pivotally supporting the tray means to pivot about horizontal carrier axes generally normal to the plane. As will be seen, the tray means associated with the carrier means remains below the levels of the carrier axes; also, each carrier means advantageously includes two supporting arms at opposite sides of the rim, and a pivot carried by the structure projecting horizontally proximate the rim.

Yet another object is to provide a wheel rim defining an outwardly presented annular recess, and the structure projecting from the rim is also received in the recess. Such a wheel may advantageously be provided by a bicycle wheel. Also, the trays may comprise elongated, molded plastic ice cube trays, as will be seen.

These and other objects and advantages of the invention, as well as the details of an illustrative embodiment, will be more fully understood from the following specification and drawings, in which:

DRAWING DESCRIPTION

FIG. 2 is an enlarged fragmentary side elevation of the FIG. 1 apparatus;

FIG. 3 is a fragmentary plan view taken on lines 3—3 of FIG. 2; and

DETAILED DESCRIPTION

Figure 1:
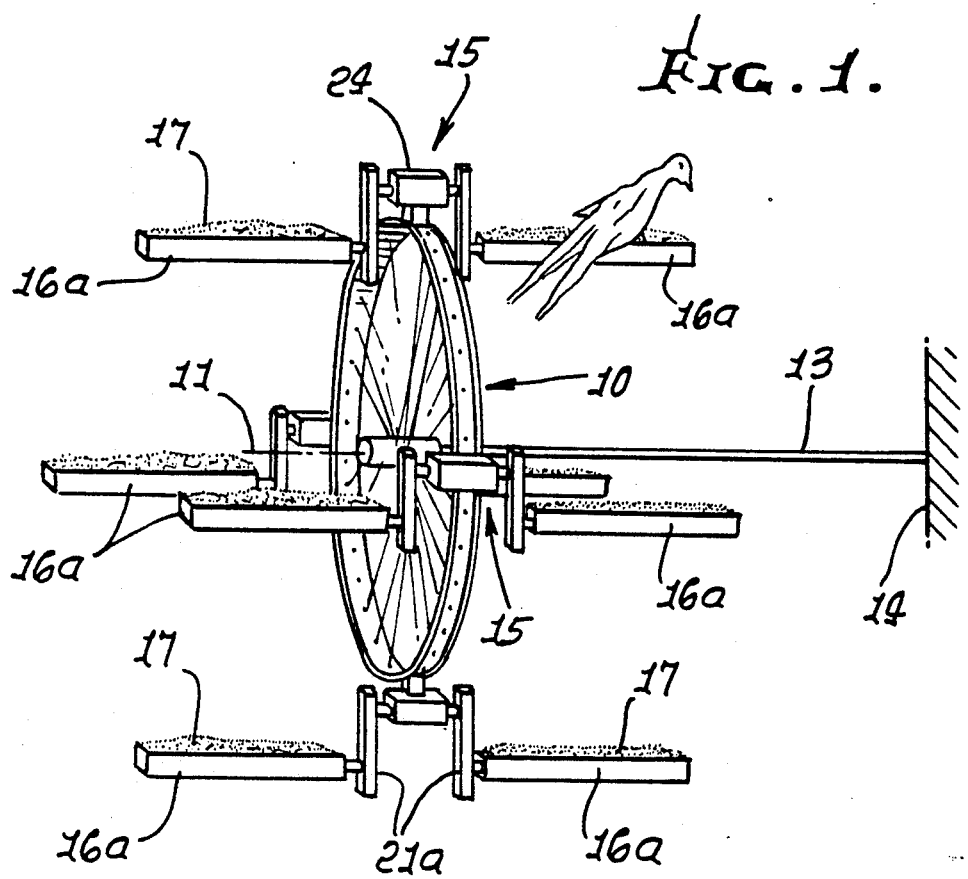
FIG. 1 is a perspective view of a bird feeder apparatus incorporating the invention.

In the drawings, a wheel 10, as for example a bicycle wheel, has a horizontal axis 11 of rotation, about which the wheel is mounted for rotation in an upright wheel plane 12. See for example the horizontal rod 13, one end of which is fixed to mounting structure 14, and the other end of which supports the wheel hub 10a for rotation, there being a wheel bearing at the hub. A bicycle wheel is especially well adapted for use in the apparatus of the invention, as it has an annular rim 10b providing an outwardly facing recess 10c. The latter can then support multiple carrier means 15 at multiple carrier locations about axis 11.

Bird feeder tray means 16 are carried by the wheel 10, to pivot relative thereto, at multiple locations about axis 11, whereby the bird feed 17 in the tray means remains presented upwardly as the wheel rotates in response to bird weight application to the tray means. In the example, the tray means projects at opposite sides of the wheel plane 12. See for example the multiple pairs of like trays 16a, four such pairs being shown, the trays 16a of each pair projecting equally and oppositely, laterally at opposite sides of the wheel 10 and plane 12. The trays may, for example, comprise laterally elongated, rectangular, plastic ice cube trays, with compartments 16b for bird feed 17. The multiplicity of compartment dividers 18 provide many upper edges to be gripped by the bird's feet, at different locations, to ease feeding.

Figure 4:
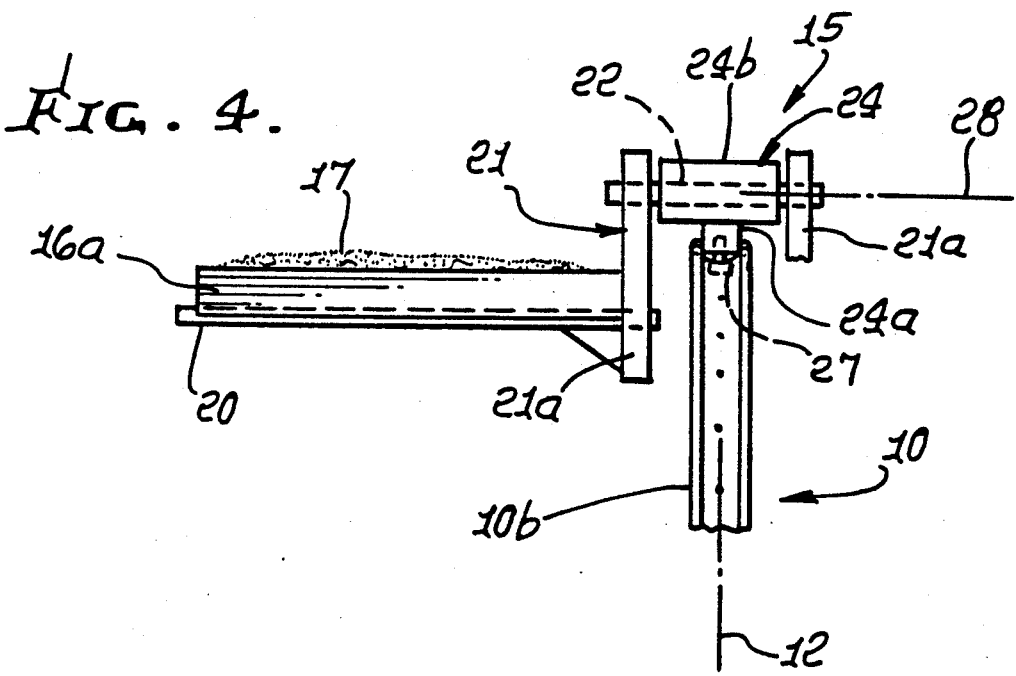
FIG. 4 is a fragmentary elevation taken on lines 4—4 of FIG. 2.

Horizontally elongated, lateral supports 20 extend under the trays to support them, and the inner ends of the supports are affixed to pivoted carrier means 21. The latter, for example, includes parallel arms 21a at opposite sides of the wheel, the supports 20 affixed to lower ends of the arms. The upper ends of the arms are pivotally supported, as by pivot rods 22 that extend horizontally and laterally, outwardly of the rim 10b. Rods 22 are in turn attached by T-shaped carrier structure 24 to the rim 10b. Structure 24 has a stem 24a that enters the rim recess to be fastened to the rim at 27. See FIG. 4. The rod 22 projects through the crosspiece 24b of structure 24, outwardly of the rim, and the arms 21a pivot about rod axis 28, whereby the trays and feed remain presented upwardly as the wheel rotates. Such rotation occurs, for example, as bird weight is applied to the trays.

Note that the trays of each pair are located below the level of the associated pivot rod axis 28. As the wheel rotates, the tray weight acts, by gravitation, to exert torque via the arms 21a to maintain the trays at lowermost levels, with bird feed presented upwardly.

Unexpected rotation of the wheel due to birds landing in the different trays results in the birds fluttering back and forth, and up and down, over the feed on the rotating trays, which provides an enjoyable scene. Many birds can feed at the same time due to the spread out area of feed presentation on the elongated trays.

Doves are especially attracted to the rotary feeding apparatus.

A wheel other than a bicycle wheel may be used.

I claim:

1. In a bird feeder apparatus, the combination comprising
   a) a bicycle wheel having an axis of rotation about which the wheel is mounted for free rotation, said axis inclined from vertical,
   b) bird feeder trays carried by the wheel to pivot relative thereto at multiple locations about said axis,
   c) whereby the bird feed in the trays remains presented upwardly as the wheel rotates in response to bird weight application to the trays,
   d) said wheel having an annular rim defining an annular outwardly presented recess,
   e) there being structures stably supported at selected positions along the recess, and carriers connected to said structures and supporting the trays to hang and freely pivot relative to the wheel.

2. The combination of claim 1 wherein said trays project at opposite sides of the wheel.

3. The combination of claim 1 wherein the trays are supported to freely pivot about horizontal axes projecting generally normal to the wheel, whereby the trays and bird feed therein remain presented upright as the wheel rotates.

4. The combination of claim 2 wherein said trays includes pairs of trays spaced about said axis, the trays of each pair projecting respectively at opposite sides of said wheel.

5. The combination of claim 4 wherein there are four of said pairs of trays, spaced at 90° intervals about said axis.

6. The combination of claim 1 wherein said carriers extend transversely of said recess and to the side of the rim.

7. The combination of claim 4 wherein said trays comprise elongated ice cube trays projecting away from the wheel plane.

8. The combination of claim 1 wherein said trays pivot about horizontal carrier axes generally normal to said wheel.

9. The combination of claim 8 wherein the trays associated with said carriers remain below the levels of said carriers.

10. The combination of claim 8 wherein said carriers include tray supporting arms at opposite sides of said rim, and a pivot carried by said structure projecting sidewardly proximate said rim for supporting each arm.

11. The combination of claim 10 wherein said structure projecting from the rim is also received in said recess.

12. In a bird feeder apparatus, the combination comprising
    a) a wheel having an axis of rotation about which the wheel is mounted for free rotation, said axis extending at an angle relative to vertical,
    b) bird feeder tray means carried by the wheel to hang and pivot relative thereto at multiple locations about said axis,
    c) whereby the tray means move up and down and the bird feed in the tray means remains presented upwardly, as the wheel rotates in response to bird weight application to the tray means,
    d) said wheel having an annular rim defining an annular outwardly presented surface,
    e) there being structures stably supported at selected positions along the rim surface, and carriers connected to said structures and supporting the trays to hang and freely pivot relative to the wheel.

13. The combination of claim 12 wherein certain tray means project at one side of the wheel.

14. The combination of claim 12 wherein the tray means include multiple trays, and including pivot means carried by the wheel and supporting the trays to freely hang and pivot as the wheel rotates, whereby the trays and bird feed therein remain presented upright as the wheel rotates.

15. The combination of claim 12 wherein said wheel is a bicycle wheel.

16. The combination of claim 12 wherein said wheel is a bicycle wheel having a hub, and including shaft means defining said axis and supporting said hub for rotation so that the wheel is everywhere elevated above ground level.

* * * * *